Nov. 20, 1956
C. E. QUINN
2,771,057
ARTIFICIAL NEST EGGS
Filed Nov. 14, 1955
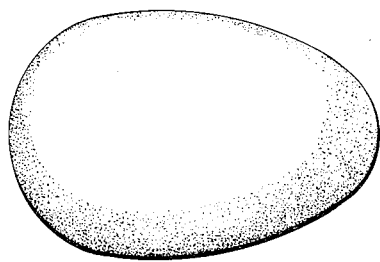
INVENTOR
Clayton E. Quinn
BY [signature]
ATTORNEY

United States Patent Office 2,771,057
Patented Nov. 20, 1956

2,771,057

ARTIFICIAL NEST EGGS

Clayton E. Quinn, Roebuck, S. C.

Application November 14, 1955, Serial No. 546,721

4 Claims. (Cl. 119—45)

My invention relates to an artificial nest egg.

An important object of the invention is to provide a bitter nest egg having a highly disagreeable taste for breaking chickens or other domestic fowls of the habit of pecking or eating eggs in the nest.

A further object of the invention is to provide a molded artificial nest egg which may be readily manufactured at the minimum expense by using ingredients which are readily available upon the market.

A further object of the invention is to provide a nest egg which is molded into the desired shape, and which will retain its shape, and has about the hardness of chalk, so that when the fowl pecks the nest egg, small particles will break off from the same to enter the mouth of the fowl and produce the highly disagreeable taste.

Other objects and advantages of the invention will be apparent during the course of the following description.

In the accompanying drawings forming a part of this application,

The figure is a side elevation of a molded artificial nest egg embodying the invention.

The composition for forming the nest egg comprises the following ingredients employed in the proportions stated:

100 pounds of powdered plaster of Paris (gypsum)
$2/16$ths or .125 of a pound of mustard oil
$4/16$ths or .250 of a pound of capsicum (herb)
$4/16$ths or .250 of a pound of pine oil
$4/16$ths or .250 of a pound of amino-nitrothiazole
1 pound of finely divided pine rosin
100 pounds of water The plaster of Paris, capsicum, pine rosin and amino-nitrothiazole are solids and are in the form of powdered or finely divided material. The mustard oil and pine oil are liquids.

All of the ingredients before recited are combined and stirred or thoroughly mixed and will produce a plastic mass which may be introduced into a mold and molded into the shape of the artificial egg shown in the drawing.

The mass is allowed to set and will become about as hard as chalk. The fowl may peck the final product or egg and small particles of the egg will break off and may pass into the mouth of the fowl, thereby producing a highly disagreeable taste. The composition produces a taste which is extremely bitter and offensive to chickens or other domestic fowls. I have found that the nest egg made in accordance with the invention is highly effective in breaking the fowls of egg pecking or eating.

While I prefer to add amino-nitrothiazole to the composition, satisfactory results may be obtained when it is omitted. Amino-nitrothiazole is in the form of a powder and is available upon the market and may be purchased from the Lederle Laboratories, Division of American Cyanamid Co., New York, New York.

The present application is a continuation-in-part of my application for Artificial Nest Eggs, filed July 15, 1954, Serial Number 443,453, which application was forfeited on March 15, 1956.

It is to be understood that the form of my invention herewith shown and described is to be taken as a preferred example of the same, and that known equivalents may be resorted to, without departing from the spirit of the invention or the scope of the sub-joined claims.

Having thus described my invention, I claim:

1. An artificial nest egg to be pecked by a fowl whereby small particles of the same enter the mouth of the fowl, said nest egg being about as hard as chalk, said nest egg comprising a mass including plaster of Paris forming the major portion of said mass and relatively small amounts of mustard oil, capsicum, pine oil and pine rosin, all ingredients being thoroughly mixed.

2. An artificial nest egg to be pecked by a fowl whereby small particles of the same enter the mouth of the fowl, said nest egg being about as hard as chalk, said nest egg comprising a mass including plaster of Paris forming the major portion of said mass and relatively small amounts of mustard oil, capsicum, pine oil, pine rosin and amino-nitrothiazole, all ingredients being thoroughly mixed.

3. An artificial nest egg to be pecked by a fowl whereby small particles of the same enter the mouth of the fowl, said nest egg having about the hardness of chalk, said nest egg comprising a relatively large amount by weight of plaster of Paris, a relatively small amount of mustard oil, a relatively small amount of capsicum, a relatively small amount of pine oil, a relatively small amount of pine rosin, a relatively small amount of amino-nitrothiazole, and a relatively large amount of water, all ingredients being thoroughly mixed before the mass sets.

4. An artificial nest egg to be pecked by a fowl whereby small particles of the same enter the mouth of the fowl, said nest egg having about the hardness of chalk, said nest egg comprising approximately 100 parts by weight of plaster of Paris, .125 part by weight of mustard oil, .250 part by weight of capsicum, .250 part by weight of pine oil, .250 part by weight of amino-nitrothiazole, 1 part by weight of pine rosin, and 100 parts by weight of water, all ingredients being thoroughly mixed before the mass sets.

References Cited in the file of this patent

UNITED STATES PATENTS

| | | |
|---|---|---|
| 591,109 | Clark | Oct. 5, 1897 |
| 817,448 | Shanahan | Apr. 10, 1906 |
| 1,223,144 | Burns | Apr. 17, 1917 |
| 1,229,881 | Burns | June 12, 1917 |